(12) United States Patent
Tujkovic et al.

(10) Patent No.: US 9,107,077 B2
(45) Date of Patent: Aug. 11, 2015

(54) METHOD AND SYSTEM FOR TIME SYNCHRONIZATION OF WIMAX AND LTE-TDD NETWORKS

(75) Inventors: Djordje Tujkovic, Santa Clara, CA (US); Louay Jalloul, San Jose, CA (US); Paulraj Arogyaswami, Stanford, CA (US)

(73) Assignee: Broadcom Corporation, Irvine, CA (US)

( * ) Notice: Subject to any disclaimer, the term of this patent is extended or adjusted under 35 U.S.C. 154(b) by 586 days.

(21) Appl. No.: 13/189,254

(22) Filed: Jul. 22, 2011

(65) Prior Publication Data

US 2012/0020256 A1   Jan. 26, 2012

Related U.S. Application Data

(60) Provisional application No. 61/367,336, filed on Jul. 23, 2010.

(51) Int. Cl.
*H04W 28/04* (2009.01)
*H04W 16/14* (2009.01)
*H04W 56/00* (2009.01)

(52) U.S. Cl.
CPC ............ *H04W 16/14* (2013.01); *H04W 56/00* (2013.01)

(58) Field of Classification Search
USPC .................................. 370/276, 278, 281, 296
See application file for complete search history.

(56) References Cited

U.S. PATENT DOCUMENTS

| | | | | |
|---|---|---|---|---|
| 6,587,444 | B1 * | 7/2003 | Lenzo et al. .................. | 370/330 |
| 7,965,661 | B2 * | 6/2011 | Stanwood et al. ............ | 370/275 |
| 8,213,943 | B2 * | 7/2012 | Malladi et al. ................ | 455/450 |
| 8,385,373 | B2 * | 2/2013 | Stratford et al. .............. | 370/508 |
| 2006/0245380 | A1 * | 11/2006 | Lenzini et al. ................ | 370/276 |
| 2007/0217348 | A1 * | 9/2007 | Tapia Moreno et al. ...... | 370/278 |
| 2008/0107049 | A1 * | 5/2008 | Stanwood et al. ............ | 370/280 |
| 2008/0279121 | A1 * | 11/2008 | Englund et al. ............... | 370/278 |
| 2008/0279143 | A1 * | 11/2008 | Lee et al. ....................... | 370/329 |
| 2010/0074220 | A1 * | 3/2010 | Papasakellariou et al. ... | 370/329 |
| 2010/0091689 | A1 * | 4/2010 | Lim et al. ...................... | 370/281 |
| 2010/0110942 | A1 * | 5/2010 | Cai et al. ....................... | 370/279 |
| 2010/0238845 | A1 * | 9/2010 | Love et al. .................... | 370/280 |
| 2010/0246458 | A1 * | 9/2010 | Myers ........................... | 370/296 |
| 2011/0255451 | A1 * | 10/2011 | Moon et al. ................... | 370/280 |
| 2011/0261716 | A1 * | 10/2011 | Kim et al. ..................... | 370/252 |
| 2011/0274063 | A1 * | 11/2011 | Li .................................. | 370/329 |

OTHER PUBLICATIONS

LTE; Evolved Universal Terrestrial Radio Access (E-UTRA); Physical Channels and Modulation (3GPP TS 36.211 version 8.9.0 Release 8), pp. 1-84.

* cited by examiner

*Primary Examiner* — Andrew Chriss
*Assistant Examiner* — Rasha Fayed
(74) *Attorney, Agent, or Firm* — Sterne, Kessler, Goldstein & Fox P.L.L.C.

(57) ABSTRACT

Embodiments of a method and system for supporting coexistence of first and second cellular networks in adjacent channels in the same geographical area are provided. The method and system synchronize the two cellular networks such that their respective uplink transmissions are aligned in time and their respective downlink transmissions are aligned in time. Such synchronization prevents (or substantially prevents) the uplink transmissions from one of the two cellular networks from overlapping with the downlink transmissions of the other cellular network, and vice versa, thereby mitigating interference between the two networks.

24 Claims, 7 Drawing Sheets

FIG. 1

| Downlink (DL) subframe | Transmit Transition Gap (TTG) | Uplink (UL) subframe | Receive Transition Gap (RTG) |

200

| No. of DL Symb. | No. of UL Symb. | Total Symb. | DL Time (ms) | UL Time (ms) | TTG Time (µs) | RTG Time (µs) | Frame Time (ms) |
|---|---|---|---|---|---|---|---|
| 35 | 12 | 47 | 3.600 | 1.234 | 105.7 | 60 | 5.0 |
| 34 | 13 | 47 | 3.497 | 1.337 | 105.7 | 60 | 5.0 |
| 33 | 14 | 47 | 3.394 | 1.440 | 105.7 | 60 | 5.0 |
| 32 | 15 | 47 | 3.291 | 1.543 | 105.7 | 60 | 5.0 |
| 31 | 16 | 47 | 3.189 | 1.646 | 105.7 | 60 | 5.0 |
| 30 | 17 | 47 | 3.086 | 1.749 | 105.7 | 60 | 5.0 |
| 29 | 18 | 47 | 2.983 | 1.851 | 105.7 | 60 | 5.0 |
| 28 | 19 | 47 | 2.880 | 1.954 | 105.7 | 60 | 5.0 |
| 27 | 20 | 47 | 2.777 | 2.057 | 105.7 | 60 | 5.0 |
| 26 | 21 | 47 | 2.674 | 2.160 | 105.7 | 60 | 5.0 |

METHOD AND SYSTEM FOR TIME SYNCHRONIZATION OF WIMAX AND LTE-TDD NETWORKS

CROSS REFERENCE TO RELATED APPLICATIONS

This application claims the benefit of U.S. Provisional Patent Application No. 61/367,336, filed Jul. 23, 2010, which is incorporated herein by reference in its entirety.

FIELD OF THE INVENTION

This application relates generally to the synchronization of two cellular networks operating over adjacent carriers or channels in the same geographical area.

BACKGROUND

A duplex communication system includes two connected transceivers that communicate with each other in both directions. There are two types of duplex communication systems: full-duplex communication systems and half-duplex communication systems. In full-duplex communication systems, the two connected transceivers communicate with each other simultaneously, in both directions. In half-duplex communication systems, the two connected transceivers communicate with each other in one direction at a time; that is, only one of the two transceivers transmits at any given point in time while the other receives.

Cellular communication networks are often half-duplex (or at least capable of operating in a half-duplex mode) as specified by the network technologies that they employ. For example, common half-duplex, cellular network technologies include Worldwide Interoperability for Microwave Access (WiMAX) operating in a Time Division Duplexing (TDD) mode and Long-Term Evolution (LTE) similarly operating in a TDD mode. TDD is the application of time-division multiplexing to separate incoming and outgoing signals and is used by WiMAX and LTE to emulate full-duplex communication over a half-duplex communication link. WiMAX is specified by the IEEE 802.16 standard, and LTE is specified by standards developed by the 3$^{rd}$ Generation Partnership Project (3GPP).

Figure 1:
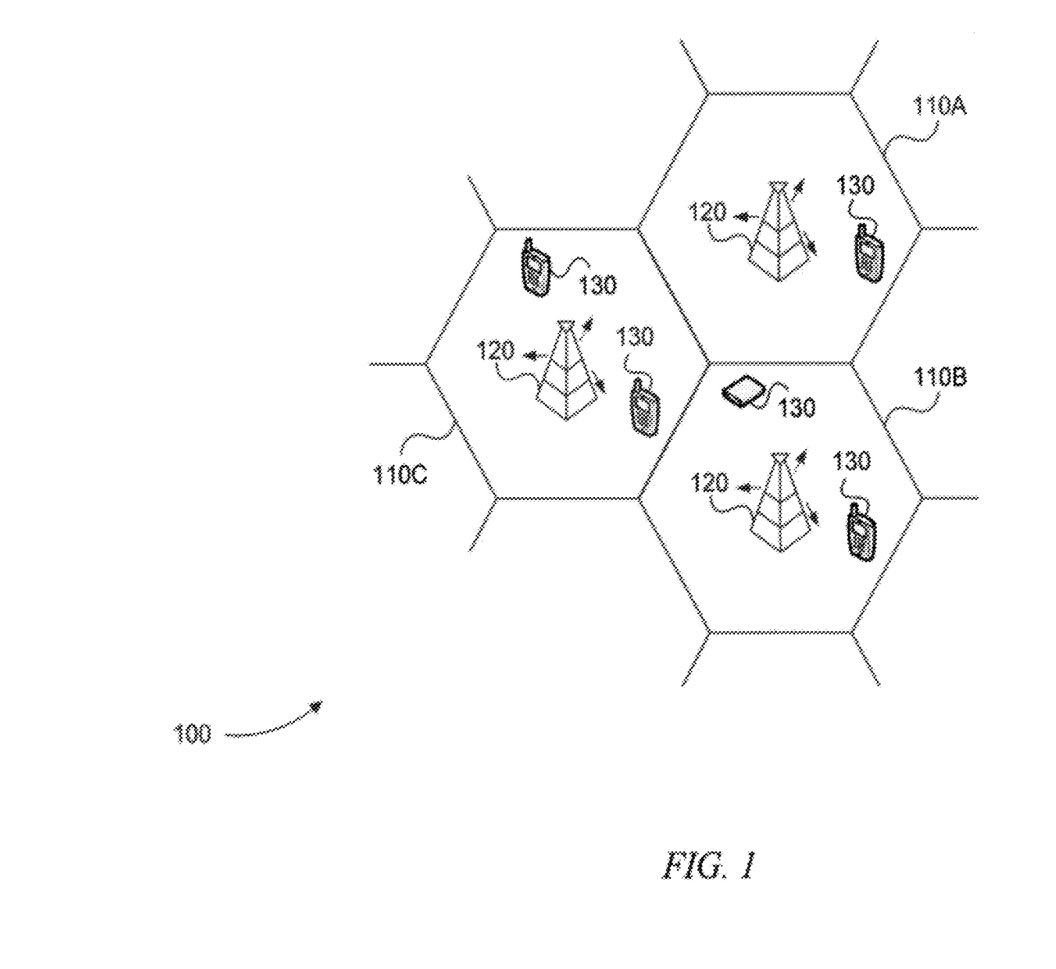
FIG. 1 illustrates a half-duplex, cellular communication system.

FIG. 1 illustrates an exemplary half-duplex cellular communication network 100, such as a WiMAX or LTE-TDD cellular communication network, distributed over land areas 110A-C called cells, each of which is served by a base station 120. Cells 100A-C are joined together to enable various user equipments (UEs) 130 (e.g., mobile phones, laptops, personal digital assistants, pagers, etc.) to transmit data to and receive data from a network (not shown) via base stations 120 over a wide geographical area.

Because cellular communication network 100 is half-duplex, UEs 130 cannot transmit data to the network via base stations 120 at the same time as they are receiving data from the network via base stations 120. This half-duplex limitation is typically the result of uplink transmissions (i.e., transmissions from UEs 130 to base stations 120) sharing the same carrier frequency or channel as downlink transmissions (i.e., transmissions from base stations 120 to UEs 130). For example, in both WiMAX and LTE-TDD there is only a single carrier frequency and uplink and downlink transmissions in a cell are separated in time.

One issue in half-duplex cellular communication networks, such as half-duplex cellular communication network 100, is potential interference from other cellular communication networks deployed in the same geographical area. In particular, when two half-duplex cellular communication networks are deployed in the same geographical area and operate over adjacent carriers (i.e., carriers next to each other in frequency), the two networks can substantially interfere with each other. The majority of the interference between the two half-duplex cellular communication networks occurs as a result of uplink transmissions from one of the two networks overlapping with downlink transmissions from the other network, and vice-versa.

Therefore, what is needed is a method and system for mitigating the interference between two half-duplex cellular communication systems operating over adjacent carriers in the same geographical area.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

Described below is a method and system for mitigating the interference between two half-duplex cellular communication networks operating over adjacent carriers in the same geographical area. The method and system synchronize the two half-duplex cellular communication networks such that their respective uplink transmissions are aligned in time and their respective downlink transmissions are aligned in time. Such synchronization prevents (or substantially prevents) the uplink transmissions from one of the two cellular communication networks from overlapping with the downlink transmissions of the other cellular communication network, and vice versa, thereby mitigating interference.

The method and system of the present invention are specifically described below in the context of a WiMAX based cellular network and a LTE-TDD based cellular network operating over adjacent carriers in the same geographical area. It should be noted, however, that the present invention is not limited to this context and can be applied to other cellular networks operating over adjacent carriers in the same geographical area.

In order to time-align the respective uplink and downlink transmissions of a WiMAX based cellular network and a LTE-TDD based cellular network, the frame configurations used by each network to communicate data are selected to have similar downlink and uplink transmission periods. Therefore, the description below begins by describing the available frame configurations in WiMAX and LTE-TDD based cellular networks. After the available frame configurations are introduced for both the WiMAX based cellular network and the LTE-TDD based cellular network, the method and system for synchronizing the two networks are described.

WiMAX Frame Configuration

Figure 2:
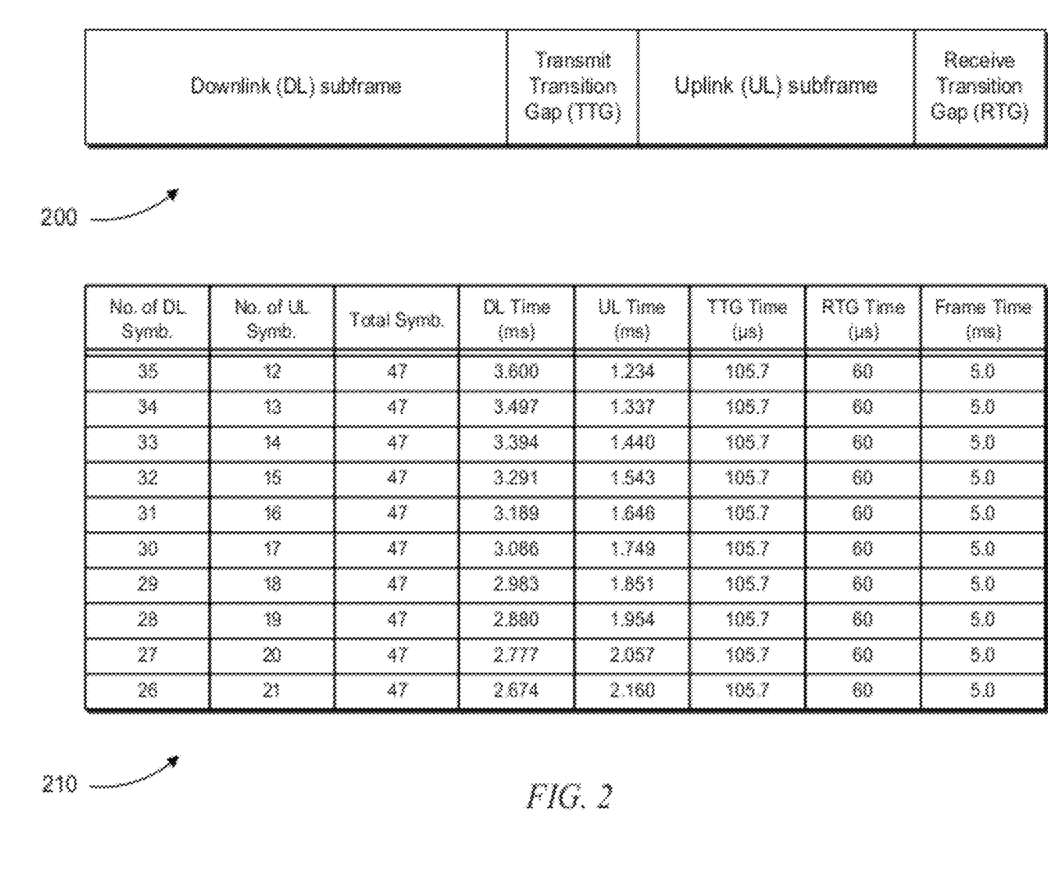
FIG. 2 illustrates the general WiMAX TDD frame configuration and a table of the specific WiMAX TDD frame configuration values.

FIG. 2 illustrates the general WiMAX TDD frame configuration 200 and a table of the specific WiMAX TDD frame configuration values 210. As illustrated, the general WiMAX TDD frame configuration 200 is divided into two main parts: a downlink (DL) subframe, where data is transmitted from the base stations to UEs, and an uplink (UL) subframe, where data is transmitted from UEs to the base stations. The DL subframe is separated from the UL subframe by a transmit/receive transition gap (TTG), and the UL subframe is separated from the DL subframe of a subsequent WiMAX TDD frame by a receive/transmit transition gap (RTG).

The length of the RTG is made sufficiently large to accommodate the time required by UEs and base stations within the WiMAX network to switch from uplink to downlink processing. The length of the TTG, on the other hand, is made sufficiently large to accommodate twice the maximum propagation delay between any base station and UE within a cell of the WiMAX network. In general, the TTG permits UEs located closer to a base station within the WiMAX network to delay their uplink transmission until UEs located farther away from a base station within the WiMAX network have completely received their downlink transmission. Without this delay, uplink transmissions of UEs closer to a base station may interfere with the reception of downlink transmissions at UEs located farther away from a base station.

In addition, the TTG permits uplink transmissions of UEs within a cell of the WiMAX network to be aligned in time. More specifically, the TTG permits a UE farther away from a base station within a cell to start its uplink transmission earlier in time than a UE closer to the base station such that the uplink transmissions from the UEs are received at the base station at or near the same time. Time alignment of uplink transmissions is important for proper recovery of the data transmitted uplink to the base station.

Referring now to table 210, the specific values for the ten available WiMAX TDD frame configurations are provided. In particular, each row of table 210 corresponds to a different one of the ten available WiMAX TDD frame configurations and provides the following values: the number of Orthogonal Frequency Division Multiplexing (OFDM) symbols within the DL and UL subframe portions of the WiMAX TDD frame, the total number of OFDM symbols within the WiMAX TDD frame, the total downlink and uplink transmission times, the TTG and RTG times, and the total WiMAX TDD frame time.

Of note, the TTG and RTG times are the same for each of the ten WiMAX frame configurations, around 105.7 microseconds ($\mu s$) and 60 $\mu s$ respectively, while the total WiMAX frame time is further the same for each of the ten WiMAX TDD frame configurations, around 5 ms. Of further note, the number of downlink symbols is always greater than the number of uplink symbols for each of the WiMAX TDD frame configurations, and the most commonly implemented WiMAX TDD frame configuration is the configuration with a downlink to uplink symbol ratio of 29:18. Using this configuration, the downlink transmission time is about 3 ms and the uplink transmission time is about 2 ms.

LTE-TDD Frame Configuration

Figure 3:
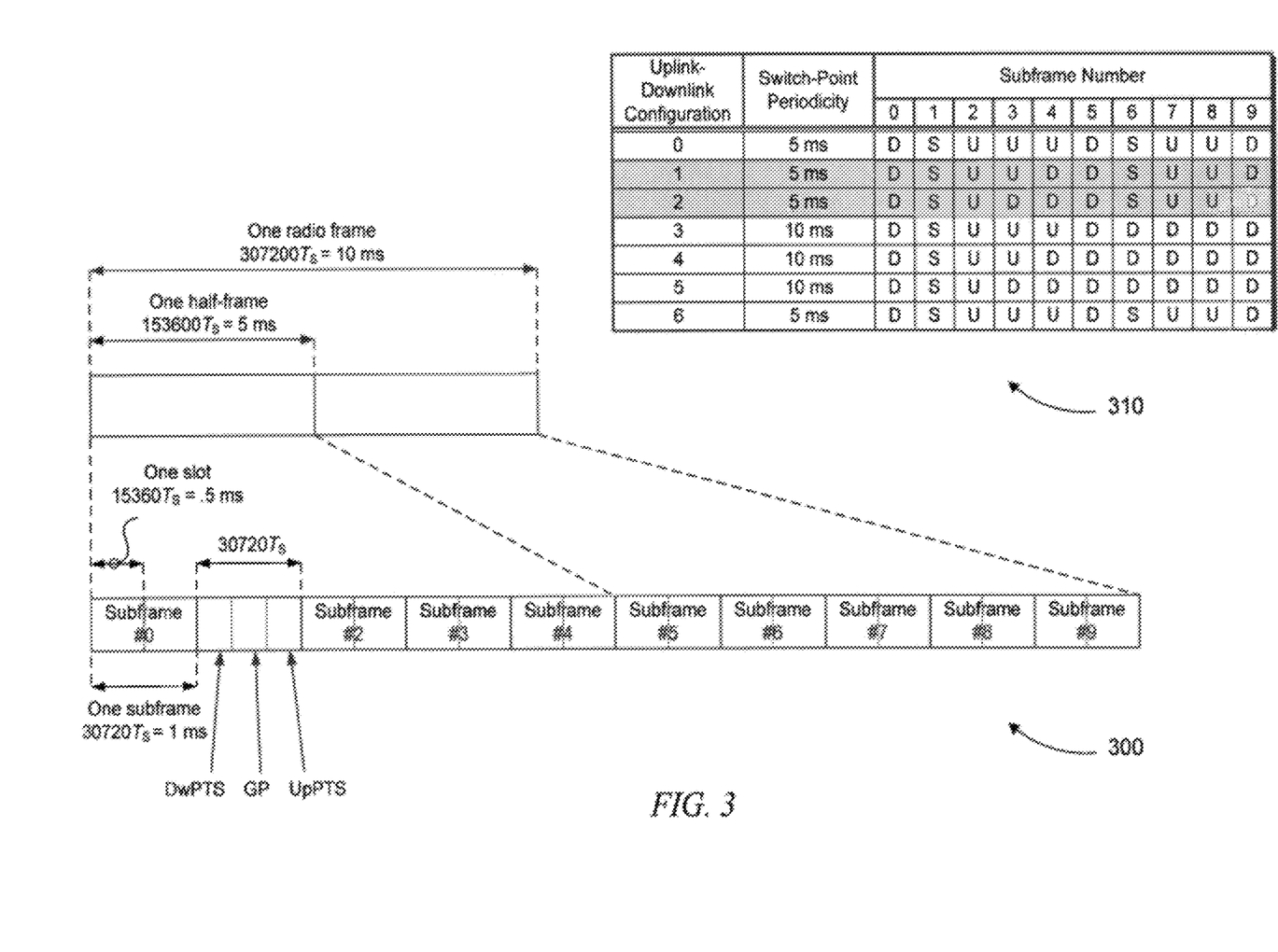
FIG. 3 illustrates the general LTE-TDD frame configuration and a table of the specific LTE-TDD uplink/downlink configurations.

FIG. 3 illustrates the general LTE-TDD frame configuration 300 and a table of the specific LTE-TDD uplink/downlink configurations 310. As illustrated, the general LTE-TDD frame configuration 300 is 10 ms in duration and consists of two 5 ms half-frames. Each half-frame is further divided into five subframes (0-4 and 5-9) that are each 1 ms in duration. The subframes typically carry 14 OFDM symbols.

Seven specific uplink/downlink configurations with either a 5 ms or a 10 ms switch point periodicity are supported by the general LTE-TDD frame configuration 300 as shown in table 310, where "D" and "U" denote subframes reserved for downlink and uplink transmissions, respectively, and "S" denotes a special subframe. Each S subframe is divided into three fields: a downlink part (DwPTS), a guard period (GP), and an uplink part (UpPTS). The structure of the S subframe is shown in subframe 1 of the general LTE-TDD frame configuration 300. To meet different network deployment arrangements, these three fields in the S subframe are configurable and the different configurations are shown in table 400 of FIG. 4.

Figure 4:
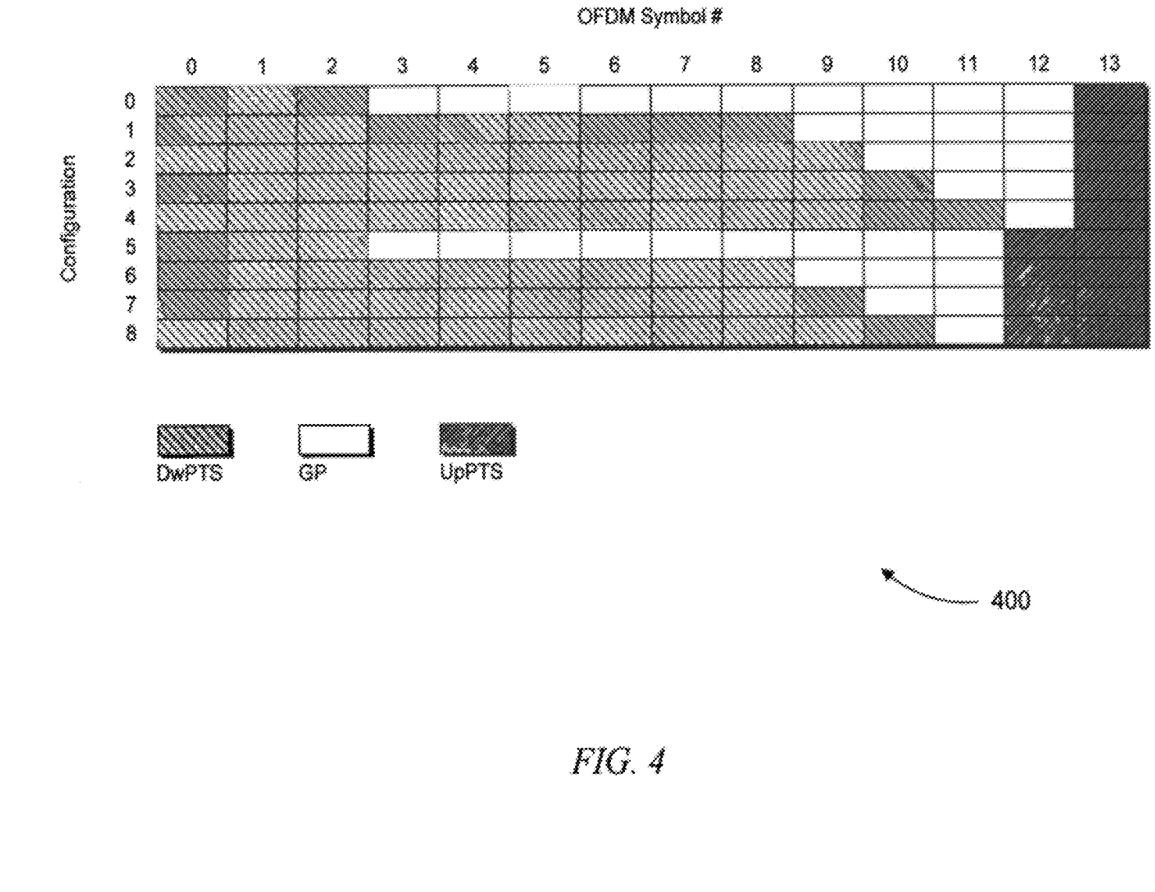
FIG. 4 illustrates a table of specific LTE-TDD special subframe configurations.

As illustrated in FIG. 4, there are a total of nine different S subframe configurations. The DwPTS portion of the S subframe is essentially a shorter downlink subframe and is used to transmit downlink data. Its length can be varied from three OFDM symbols up to 12 OFDM symbols.

The UpPTS portion of the S subframe can be varied to have one OFDM symbol or two OFDM symbols and can be used to transmit uplink sounding reference signals and for random access. Uplink sounding reference signals are known signals transmitted from UEs to allow base stations (or so called evolved NodeB's in LTE networks) to estimate uplink channel quality. These estimates can be used to perform link adaptation and scheduling, for example. Random access is used to establish uplink-timing alignment at a UE through a contention based procedure. In general, a UE transmits a pre-defined random access preamble uplink to a base station during the UpPTS portion of the S subframe, which allows the base station to estimate and correct the uplink transmission timing of the UE.

During operation of the LTE-TDD network, the GP portion of the S subframe is split between the downlink-to-uplink switch and the uplink-to-downlink switch within a complete LTE-TDD frame and provides the necessary guard time for these switches. For example, the GP portion is used to time align the uplink transmissions from the UEs within the network and is used to accommodate the time required by base stations within the LTE-TDD network to switch from uplink to downlink processing.

Method and System for Synchronizing the Two Networks

As noted above, the present invention provides a method and system for mitigating the interference between an LTE-TDD based cellular network and a WiMAX based cellular network operating over adjacent carriers in the same geographical area. The method and system synchronize the two networks such that their respective uplink transmissions are aligned in time and their respective downlink transmissions are aligned in time. Such synchronization prevents (or substantially prevents) the uplink transmissions from one of the two cellular communication networks from overlapping with the downlink transmissions of the other cellular communication network, and vice versa, thereby mitigating interference.

In order to time-align the respective uplink and downlink transmissions of a WiMAX based cellular network and a LTE-TDD based cellular network, the LTE-TDD network should use a frame configuration with a 5 ms switch-point periodicity to match the fixed, 5 ms frame period of the WiMAX network. This condition eliminates all but the 0, 1, 2, and 6 LTE-TDD frame configurations (or uplink/downlink configurations) illustrated in table 310 of FIG. 3 as possible frame configuration options for the LTE-TDD network.

In addition to the above condition, the respective frame configurations for the two networks should have similar downlink and uplink transmission periods. Because the number of downlink symbols and downlink time is always greater than the number of uplink symbols and uplink time for each of the ten WiMAX TDD frame configurations shown in table 210 of FIG. 2, of the four remaining LTE-TDD frame configuration possibilities, only frame configurations 1 and 2 remain as possible frame configuration options for the LTE-TDD network. Unlike frame configurations 0 and 6, frame configurations 1 and 2 have more downlink symbols and downlink time than uplink symbols and uplink time (remembering that the DwPTS portion of the S subframe is essentially a shorter downlink subframe and is used to transmit downlink data).

Therefore, depending on which of the ten available WiMAX TDD frame configurations is being used by the WiMAX based cellular network, either frame configuration 1 or 2 can be used within the LTE-TDD based cellular network (in combination with one of the nine different S subframe configurations illustrated in FIG. 4) to time-align the respective uplink and downlink transmissions of the two networks. Rather than list each and every one of these different combinations, it will be appreciated by one of ordinary skill in the art that the method and system of the present invention can be used with a number of these different WiMAX/LTE-TDD frame configuration combinations.

Figure 5:
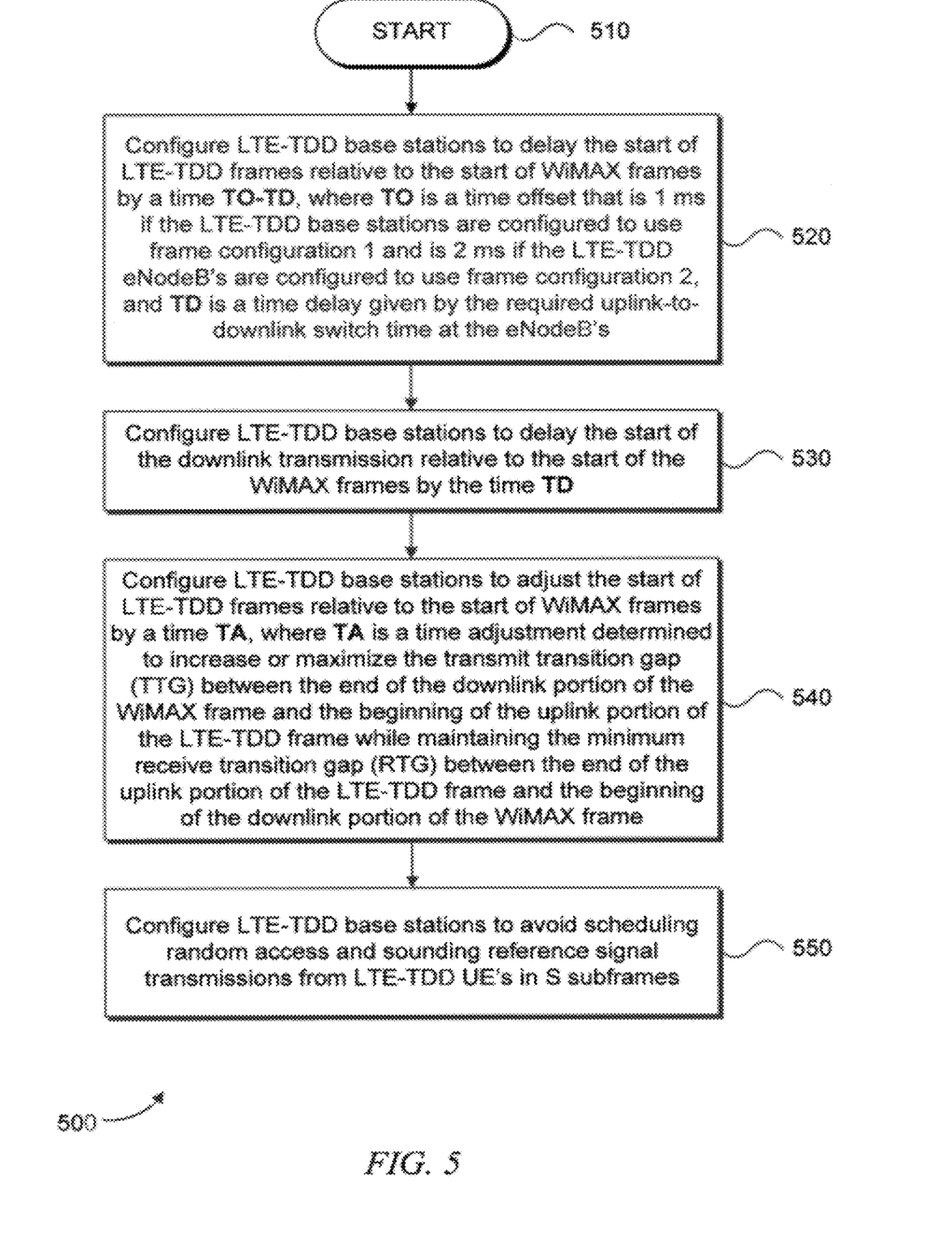
FIG. 5 illustrates a method for synchronizing two cellular communication networks operating in adjacent channels in the same geographical area, according to embodiments of the present invention.

Referring now to FIG. 5, a flowchart 500 of a method for synchronizing an LTE-TDD based cellular network with a WiMAX based cellular network that are operating in adjacent channels in the same geographical area is depicted, according to embodiments of the present invention. Flowchart 500 is described with continued reference to the timing diagram illustrated in FIG. 6, which roughly shows to scale frames from a WiMAX based cellular network being synchronized with frames of a LTE-TDD based cellular network. It should be noted, however, that flowchart 500 is not limited to synchronizing the particular frame configurations illustrated by the timing diagram in FIG. 6 and can be used to synchronize a number of different frame configurations. It should be further noted that the steps in flowchart 500 do not have to occur in the order shown.

Figure 6:
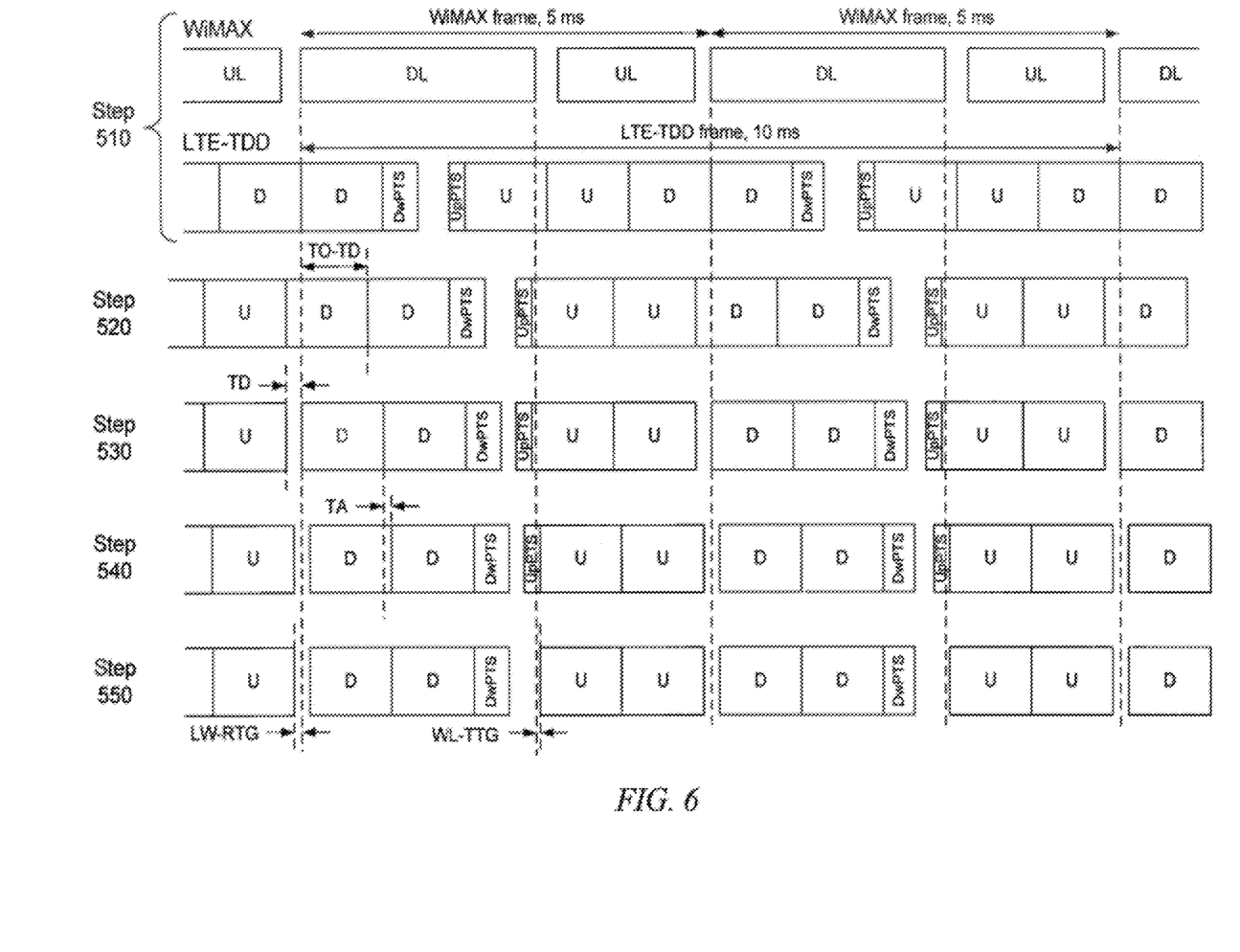
FIG. 6 illustrates a timing diagram for synchronizing two cellular communication networks operating in adjacent channels in the same geographical area, according to embodiments of the present invention.

Flowchart 500 starts at step 510. In FIG. 6, the initial alignment of the frames from the WiMAX based cellular network and the frames of the LTE-TDD based cellular is shown for step 510. The frames from the WiMAX based cellular network shown in FIG. 6 have a downlink-to-uplink symbol ratio of 29:18. The frames of the LTE-TDD based cellular network shown in FIG. 6 have the second configuration type shown in table 310 of FIG. 3 and use S subframe configuration 4 shown in table 400 of FIG. 4. As can be seen from the initial alignment in FIG. 6, the downlink portions of the WiMAX frames (labeled as "DL") overlap with the uplink portions of the LTE-TDD frames (labeled as "U"), and the downlink portions of the LTE-TDD frames (labeled as "D") overlap with the uplink portions of the WiMAX frames (labeled as "UL"). As presently positioned relative to each other, the WiMAX and LTE-TDD frames can result in substantial interference between the two networks.

In step 520, one or more base stations (or eNodeB's) in the LTE-TDD based cellular network are configured to delay the start of the LTE-TDD frames relative to the start of the WiMAX frames by a time TO–TD. TO is a time offset that is 1 ms (or about 1 ms) if the LTE-TDD base stations are configured to use frame configuration 1 illustrated in table 310 of FIG. 3 and is 2 ms (or about 2 ms) if the LTE-TDD base stations are configured to use frame configuration 2 illustrated in table 310 of FIG. 3. In the exemplary timing diagram illustrated in FIG. 6, the LTE-TDD base stations are configured to use frame configuration 1 and therefore TO is equal to 1 ms in this specific instance. TD is a time delay and is given by the time required or allotted for the base stations within the LTE-TDD based cellular network to switch from uplink-to-downlink processing. TD is usually around 20 µs for most LTE-TDD based cellular networks.

In step 530, the one or more base stations in the LTE-TDD based cellular network are configured to delay the start of only the downlink portion of the LTE-TDD frames (labeled as "D") relative to the start of the WiMAX frames by the time TD. As noted above in step 520, TD is a time delay and is given by the time required or allotted for the base stations within the LTE-TDD based cellular network to switch from uplink-to-downlink processing.

In step 540, the one or more base stations in the LTE-TDD based cellular network are configured to advance the start of the LTE-TDD frames relative to the start of the WiMAX frames by a time TA. TA is a time adjustment determined to increase or maximize the transmit/receive transition gap (TTG) between the end of the downlink portion of the WiMAX frame and the beginning of the uplink portion of the LTE-TDD frame (labeled as "WL-TTG" in FIG. 6), while maintaining the minimum receive/transmit transition gap (RTG) between the end of the uplink portion of the LTE-TDD frame and the beginning of the downlink portion of the WiMAX frame (labeled as "LW-RTG" in FIG. 6). As shown in table 210, illustrated in FIG. 2, the minimum RTG is 60 µs for WiMAX frames with a downlink-to-uplink symbol ratio of 29:18.

In one embodiment, step 540 can be omitted from method 500 and no timing adjustment of the LTE-TDD frames relative to the start of the WiMAX frames by a time TA will be performed.

In step 550, the one or more base stations in the LTE-TDD based cellular network are configured to avoid scheduling random access and sounding reference signal transmissions from the UE's within the LTE-TDD network during S subframes. More specifically, the one or more base stations in the LTE-TDD based cellular network are configured to avoid scheduling random access and sounding reference signal transmissions from the UE's within the LTE-TDD network during the UpPTS portion of the S subframes. Therefore, as illustrated in FIG. 6, at step 550 the UpPTS portion of the S subframes of the LTE-TDD frames are dropped and now become additional guard period for the S subframes.

As can be seen from FIG. 6, at step 550, the downlink portions of the WiMAX frames (labeled as "DL") no longer overlap with the uplink portions of the LTE-TDD frames (labeled as "U"), and the downlink portions of the LTE-TDD frames (labeled as "D") no longer overlap with the uplink portions of the WiMAX frames (labeled as "UL"). This synchronization of the two networks helps to prevent mutual interference as discussed above and promotes the coexistence of these two networks in the same geographical area.

It should be noted that, rather than looking at the synchronization of two networks as a series of steps, as depicted by flowchart 500 illustrated in FIG. 5, the method of synchronization can be viewed as two time shifts: a first time shift of the uplink portion of the LTE-TDD frames relative to the WiMAX frames, and a second time shift of the downlink portion of the LTE-TDD frames relative to the WiMAX frames.

The first time shift of the uplink portion of the LTE-TDD frames relative to the WiMAX frames, in one embodiment, is equal to (or nearly equal to) TO-TD. As noted above, TO is a time offset that is 1 ms (or about 1 ms) if the LTE-TDD base stations are configured to use frame configuration 1 illustrated in table 310 of FIG. 3 and is 2 ms (or about 2 ms) if the LTE-TDD base stations are configured to use frame configuration 2 illustrated in table 310 of FIG. 3. TD is a time delay and is given by the time required or allotted for the base stations within the LTE-TDD based cellular network to switch from uplink-to-downlink processing.

In another embodiment, the first time shift of the uplink portion of the LTE-TDD frames relative to the WiMAX frames is equal to (or nearly equal to) TO−TD+TA. As noted above, TA is a time adjustment determined to increase or maximize the transmit/receive transition gap (TTG) between the end of the downlink portion of the WiMAX frame and the beginning of the uplink portion of the LTE-TDD frame, while maintaining the minimum receive/transmit transition gap (RTG) between the end of the uplink portion of the LTE-TDD frame and the beginning of the downlink portion of the WiMAX frame.

The second time shift of the downlink portion of the LTE-TDD frames relative to the WiMAX frames, in one embodiment, is equal to (or nearly equal to) TO. As noted above, TO is a time offset that is 1 ms (or about 1 ms) if the LTE-TDD base stations are configured to use frame configuration 1 illustrated in table 310 of FIG. 3 and is 2 ms (or about 2 ms) if the LTE-TDD base stations are configured to use frame configuration 2 illustrated in table 310 of FIG. 3.

In another embodiment, the second time shift of the downlink portion of the LTE-TDD frames relative to the WiMAX frames is equal to (or nearly equal to) TO+TA. As noted above, TA is a time adjustment determined to increase or maximize the transmit/receive transition gap (TTG) between the end of the downlink portion of the WiMAX frame and the beginning of the uplink portion of the LTE-TDD frame, while maintaining the minimum receive/transmit transition gap (RTG) between the end of the uplink portion of the LTE-TDD frame and the beginning of the downlink portion of the WiMAX frame.

It should be noted that other first and second time shifts, calculated in different manners and having different resulting values than described above, can be used with the idea of avoiding scheduling random access and sounding reference signal transmissions from UE's within the LTE-TDD network during S subframes. More specifically, other first and second timing shifts, calculated in different manners and having different resulting values than described above, can be used with the idea of avoiding scheduling random access and sounding reference signal transmissions from the UE's within the LTE-TDD network during the UpPTS portion of the S subframes. In general, the idea of avoiding scheduling of random access and sounding reference signal transmissions from the UE's within the LTE-TDD network during the UpPTS portion of the S subframes can help to prevent overlap of uplink transmissions from one of the two cellular communication networks with downlink transmissions of the other cellular communication network, and vice versa, without requiring either of the two networks to drop symbols (i.e., not transmit them) to prevent overlap.

Figure 7:
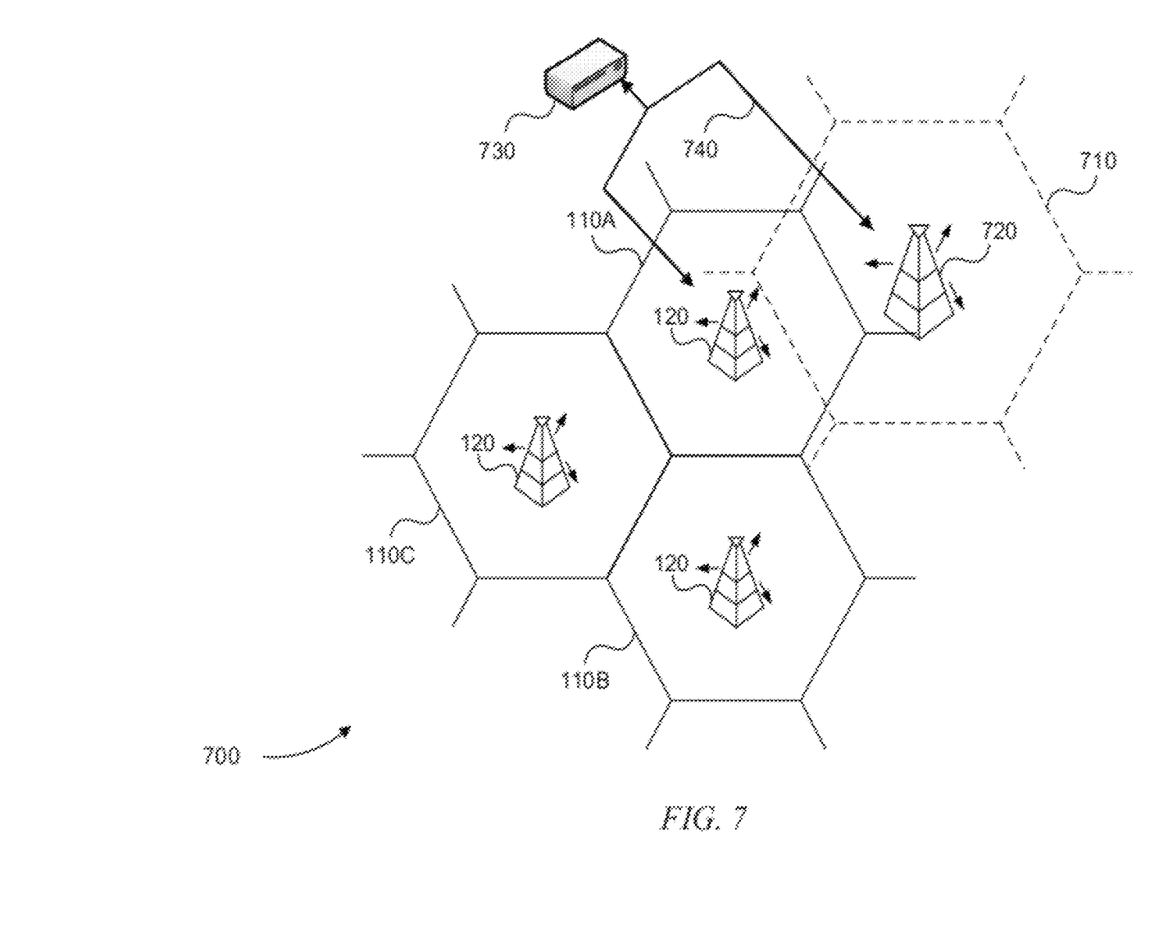
FIG. 7 illustrates a system for synchronizing two cellular communication systems operating in adjacent channels in the same geographical area, according to embodiments of the present invention.

Referring now to FIG. 7, a system 700 for synchronizing two cellular communication systems operating in adjacent channels in the same geographical area is illustrated, according to embodiments of the present invention. System 700 includes two half-duplex cellular networks operating over adjacent carriers in the same geographical area. In particular, system 700 includes a first cellular network (described above in FIG. 1), which has a number of cells 110A-C, and a second cellular network, which has only one cell shown 710 for clarity purposes. Cells 110A-C of the first cellular network are each served by a base station 120, and cell 710 is served by a base station 720.

In one embodiment, the first cellular network is a WiMAX based cellular network and the second cellular network is a LTE-TDD based cellular network. System 700 includes a controller 730 that communicates with base stations 120 and 720 to synchronize the two cellular networks such that their respective uplink transmissions are aligned in time and their respective downlink transmissions are aligned in time. Such synchronization prevents (or substantially prevents) the uplink transmissions from one of the two cellular communication networks from overlapping with the downlink transmissions of the other cellular communication network, and vice versa, thereby mitigating interference. Controller 730 communicates with base stations 120 and 720 over communication link 740, which may be wired or wireless, and is configured to perform the method depicted by flowchart 500 illustrated in FIG. 5 and described above.

CONCLUSION

It will be appreciated that the above described embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, or acoustical.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The breadth and scope of the present invention should not be limited by any of the above-described exemplary embodiments, but should be defined only in accordance with the following claims and their equivalents.

What is claimed is:

1. A method for supporting co-existence of first and second cellular networks in adjacent channels, the first cellular network communicating a first frame of data and the second cellular network communicating a second frame of data, the method comprising:
   shifting communication of an uplink portion of the first frame relative to communication of the second frame by a first time to mitigate transmission of the uplink portion of the first frame during transmission of a downlink portion of the second frame;
   shifting communication of a downlink portion of the first frame relative to communication of the second frame by a second time to mitigate transmission of the downlink portion of the first frame during transmission of an uplink portion of the second frame; and
   preventing transmission of uplink sounding reference signals and random access during a special subframe in the first frame based on the special subframe overlapping in time with the downlink portion of the second frame.

2. The method of claim 1, wherein shifting communication of the uplink portion and the downlink portion of the first frame further comprises:
   determining the first time and the second time based on a frame configuration of the first frame.

3. The method of claim 1, wherein shifting communication of the uplink portion of the first frame further comprises:
   determining the first time based on a difference between an integer number of milliseconds and a required uplink-to-downlink switch time at a base station of the first cellular network configured to transmit the downlink portion of the first frame.

4. The method of claim 3, wherein determining the first time further comprises:
   determining the first time based on a required receive/transmit transition gap time between an end of the uplink portion of the first frame and a beginning of a downlink portion of the second frame.

5. The method of claim 4, wherein determining the first time further comprises:
   determining the first time to increase a transmit/receive transition gap time between the end of the downlink portion of the second frame and a beginning of the uplink portion of the first frame while maintaining the required receive/transmit transition gap time.

6. The method of claim 1, wherein shifting communication of the downlink portion of the first frame further comprises:
   determining the second time based on an integer number of milliseconds.

7. The method of claim 1, wherein the first cellular network is configured to operate according to an Institute of Electrical and Electronics Engineers 802.16e standard, and the second cellular network is configured to operate according to a Third Generation Partnership Project Long Term Evolution-Time Division Duplex standard.

8. The method of claim 7, wherein the second frame configuration has a ratio of downlink symbols to uplink symbols of 29:18.

9. The method of claim 8, wherein the first frame consists of four downlink subframes, four uplink subframes, and two special subframes.

10. The method of claim 9, wherein the two special subframes each consist of a downlink part, a guard period, and an uplink part.

11. The method of claim 10, wherein the downlink part consists of twelve downlink symbols and the uplink part consists of one uplink symbol.

12. A system for supporting co-existence of first and second cellular networks in adjacent channels, the first cellular network communicating a first frame of data and the second cellular network communicating a second frame of data, the system comprising:
   a first base station configured to operate in the first cellular network;
   a second base station configured to operate in the second cellular network; and
   a system controller configured to control the first base station and the second base station to:
      shift communication of an uplink portion of the first frame relative to communication of the second frame by a first time to mitigate transmission of the uplink portion of the first frame during transmission of a downlink portion of the second frame;
      shift communication of a downlink portion of the first frame relative to communication of the second frame by a second time to mitigate transmission of the downlink portion of the first frame during transmission of an uplink portion of the second frame; and
      prevent transmission of uplink sounding reference signals and random access during a special subframe in the first frame based on the special subframe overlapping in time with the downlink portion of the second frame.

13. The system of claim 12, wherein the first time and the second time are determined based on a frame configuration of the first frame.

14. The system of claim 12, wherein the first time is determined based on a difference between an integer number of milliseconds and a required uplink-to-downlink switch time at the first base station.

15. The system of claim 14, wherein the first time is determined based on a required receive/transmit transition gap time between an end of the uplink portion of the first frame and a beginning of a downlink portion of the second frame.

16. The system of claim 15, wherein the first time is determined to increase a transmit/receive transition gap time between the end of the downlink portion of the second frame and a beginning of the uplink portion of the first frame while maintaining the required receive/transmit transition gap time.

17. The system of claim 12, wherein the second time is determined based on an integer number of milliseconds.

18. The system of claim 12, wherein the first cellular network is configured to operate according to an Institute of Electrical and Electronics Engineers 802.16e standard, and the second cellular network is configured to operate according to a Third Generation Partnership Project Long Term Evolution-Time Division Duplex standard.

19. The system of claim 18, wherein the second frame has a ratio of downlink symbols to uplink symbols of 29:18.

20. The system of claim 19, wherein the first frame consists of four downlink subframes, four uplink subframes, and two special subframes.

21. The system of claim 20, wherein the two special subframes each consist of a downlink part, a guard period, and an uplink part.

22. The system of claim 21, wherein the downlink part consists of twelve downlink symbols and the uplink part consists of one uplink symbol.

23. The system of claim 12, wherein the system controller is configured to control the first base station and the second base station to prevent transmission of the uplink sounding reference signals and the random access during the special subframe in the first frame to further mitigate transmission of the uplink portion of the first frame during transmission of the downlink portion of the second frame.

24. The method of claim 1, wherein preventing transmission of the uplink sounding reference signals and the random access during the special subframe in the first frame is performed to further mitigate transmission of the uplink portion of the first frame during transmission of the downlink portion of the second frame.

\* \* \* \* \*